United States Patent [19]

Ohtomo

[11] Patent Number: 5,661,706
[45] Date of Patent: Aug. 26, 1997

[54] RECORDING AND REPRODUCING APPARATUS AND RECORDING AND REPRODUCING METHOD PROVIDING REAL TIME EDITING WHILE DATA IS BEING INPUT

[75] Inventor: Katsuhiko Ohtomo, Miyagi, Japan

[73] Assignee: Sony Corporation, Tokyo, Japan

[21] Appl. No.: 556,068

[22] Filed: Nov. 9, 1995

[30] Foreign Application Priority Data

Nov. 14, 1994 [JP] Japan ..................... 6-279335

[51] Int. Cl.$^6$ ..................................... G11B 7/00
[52] U.S. Cl. ................. 369/54; 369/60; 369/124
[58] Field of Search ............... 369/47, 48, 54, 369/60, 13, 3, 53, 44.32, 83, 124; 360/13

[56] References Cited

U.S. PATENT DOCUMENTS

| | | | |
|---|---|---|---|
| 5,212,678 | 5/1993 | Roth et al. | 369/60 |
| 5,224,087 | 6/1993 | Maeda et al. | 369/54 |
| 5,291,467 | 3/1994 | Ishiwata et al. | 369/44.28 |
| 5,325,347 | 6/1994 | Sako | 369/48 |
| 5,491,677 | 2/1996 | Sasaki | 369/60 |
| 5,502,701 | 3/1996 | Kudo et al. | 369/54 |

*Primary Examiner*—Thang V. Tran
*Attorney, Agent, or Firm*—Limbach & Limbach L.L.P.

[57] ABSTRACT

An editing can be made in real time while data is being input. A recording and reproducing method comprises a first processing step for reading out first information (D1) on a recording medium (D) and storing the first information (D1) thus read out in a storage memory (18), a second processing step for writing third information (D3), which results from synthesizing the first information (D1) read out from the recording medium (D) and second information (D2) input from the outside, in an output memory (19), and a third processing step for reading third information (D3) of a predetermined capacity from the output memory (19) and recording the third information (D3) thus read out on the recording medium (D), wherein after a first operation cycle composed of the first processing step, the second processing step and a loop processing operation for repeating a composite operation of the second and third processing steps until the storage capacity of the storage memory (18) reaches a predetermined capacity is carried out once, a second operation cycle composed of the first processing step and a loop processing operation for repeating a composite operation of the second and third processing steps until the storage capacity of the storage memory (18) reaches a predetermined capacity is repeated until the reading is finished.

12 Claims, 5 Drawing Sheets

RECORDING AND REPRODUCING APPARATUS AND RECORDING AND REPRODUCING METHOD PROVIDING REAL TIME EDITING WHILE DATA IS BEING INPUT

BACKGROUND OF THE INVENTION

The present invention relates to a recording and reproducing apparatus and a recording and reproducing method for recording and reproducing an information signal in and from a disk-like recording medium such as an optical disk or a magnetooptical disk.

A known disk-like recording medium (hereinafter simply referred to as an optical disk) in and from which an information signal is recorded and reproduced by laser beam is classified into a read-only optical disk called a compact disk, a write-once optical disk in which an information can be recorded once and a recordable optical disk in which an information signal can be not only reproduced but also recorded and erased.

In the read-only optical disk, tracks on which irregular patterns, i.e., phase pits are concentrically or spirally formed based on a recorded information signal are formed on one surface. Specifically, the read-only optical disk is composed of a disk substrate made of a transparent synthetic resin such as a polycarbonate or polymethyl methacrylate (PMMA), a reflecting film made of a metal such as Al or Au formed so as to cover the phase pits formed on one surface of the disk substrate and a protecting film formed on the reflecting film so as to protect the reflecting film.

When an information signal is reproduced from the read-only optical disk, laser beam emitted from a laser light source is irradiated on the read-only optical disk from the disk substrate side under being converged by an objective lens, reflected light bundle modulated by the phase pits on the optical disk is detected by a photodetector, for example, and converted into a detected signal having signal level corresponding to an intensity of reflected light bundle, thereby obtaining a reproduced signal of information signal recorded on the read-only optical disk.

A known recordable optical disk is a magnetooptical disk using a vertical magnetic recording material. The magnetooptical disk has a guide groove for guiding laser beam formed on one surface thereof and is composed of a disk substrate made of a transparent synthetic resin such as polycarbonate or PMMA, a recording layer made of a vertical recording material such as Te, Fe or Co formed so as to cover the guide groove and a protecting layer formed on the recording layer so as to protect the recording layer.

When an information signal is reproduced from the magnetooptical disk, similarly to the read-only optical disk, laser beam emitted from the laser light source is irradiated on the magnetooptical disk from the disk substrate side under being converted by the objective lens and a Kerr rotation angle of reflected light bundle modulated by the recording layer of the optical disk is detected to thereby obtain a reproduced signal of the information signal recorded on the magnetooptical disk.

The write-once optical disk is of a recording system using a physical chemistry change of dye, a hole-making recording system by a single layer, a hole-making recording system by a multilayer, a phase-change recording system and a bubble-forming recording system. Upon reproduction, similarly to the read-only optical disk, a laser beam (weak reproducing output power) from the laser light source is irradiated on the write-once optical disk from the disk substrate underside being converged by the objective lens. Then, reflected light bundle modulated by previously-recorded pits is detected by the photodetector and converted into the detected signal having the signal level corresponding to the intensity of the reflected light bundle, thereby obtaining an information signal recorded on the read-only optical disk.

As described above, when an information signal is recorded on and reproduced from the optical disk or magnetooptical disk, information recorded on the disk is read out by the optical head and sequentially processed, whereby recorded information is processed in real time and a reproduced signal is output. When on the other hand an information signal is recorded, a digitized information signal is supplied to the optical head, whereby desired recording information is recorded on a recording layer of an optical disk.

In the recording and reproducing apparatus, however, a reproducing drive device and a recording drive device are required in order to edit and record data on the disk, e.g., audio data. Therefore, at least two drive devices are required with the result that the overall arrangement of the recording and reproducing apparatus cannot be miniaturized.

In the recording and reproducing system, recording information and reproducing information are input or output in real time. As a consequence, information cannot be recorded and reproduced simultaneously within a single disk.

An existing drive device cannot edit data within the single disk while data is being input in real time.

In the disk drive, it is frequently observed that a so called track jump occurs due to application of external shock during recording and reproducing operation. If the disk drive is reproducing information, then a reproduced sound is lost. If the disk drive is recording information, then an information is recorded on a track different from a track on which the information signal should be recorded.

In particular, in the recording and reproducing apparatus for an optical disk and a magnetooptical disk, if a track jump occurs during a recording operation, then the laser beam irradiates a recorded track and recorded information will be damaged.

Therefore, it is customary that the recording and reproducing apparatus includes a housing in which a recording and reproducing unit is held through a buffer mechanism. Thus, an external shock transmitted to the recording and reproducing unit can be suppressed. However, in actual practice, it is very difficult to completely exclude a shock applied from the outside.

SUMMARY OF THE INVENTION

In view of the aforesaid aspect, it is an object of the present invention to provide a recording and reproducing apparatus in which recording and reproduction can be carried out simultaneously in real time.

It is another object of the present invention to provide a recording and reproducing apparatus in which an edit can be carried out in real time while data is being input.

It is a further object of the present invention to provide a recording and reproducing apparatus in which an information signal can be continuously reproduced even when the recording and reproducing apparatus is affected by an external shock occurring during recording and reproducing and in which an information signal can be prevented from being erroneously recorded on a recording medium.

According to the present invention, a recording and reproducing apparatus for recording and reproducing information in and from a recording medium comprises a first processing means for reading out first information from the recording medium and storing the information thus read out in a storage memory, a second processing means for reading out the first information of a predetermined capacity from the storage memory and writing third information, which results from synthesizing the first information and second information input thereto from the outside, in an empty memory, a third processing means for reading out the third information of a predetermined capacity from the memory in which the third information is stored and recording the third information thus read out in the recording medium, a first control means for effecting a first operation cycle composed of a processing operation done by the first processing means, a processing operation done by the second processing means, and a loop processing operation for repeating a composite operation of the second and third processing means until a storage memory of the storage capacity reaches a predetermined capacity, a second control means for effecting a second operation cycle composed of the processing operation done by the first processing means and the loop processing operation for repeating a composite operation of the second and third processing means until the storage capacity of the storage memory reaches a predetermined capacity, and a third control means for controlling the second control means so that the second control means repeats the first operation cycle until reading is ended after the first control means executed the first operation cycle once.

In the above recording and reproducing apparatus, the first information on the recording medium is read out by the first processing means and stored in the storage memory. The first information of a predetermined capacity is read out from the storage memory by the second processing means. Then, the third information, which results from synthesizing the first information thus read out and the second information input from the outside, is written in the empty memory. The third information of a predetermined capacity is read out by the third processing means from the memory in which the third information is stored. The third information thus read out is recorded on the recording medium.

The loop processing operation is carried out such that after the processing operation is done by the first processing means under control of the first control means, a processing operation is carried out by the second processing means and the composite operation done by the second and third processing means is repeated until the storage capacity of the storage memory reaches a predetermined capacity. Further, a loop processing operation is carried out such that after the processing operation is carried out by the first processing means under control of the second control means, the composite operation of the second and third processing means is repeated until the storage capacity of the storage memory reaches the predetermined capacity.

Under control of the third control means, the first operation cycle is carried out once by the first control means and then the second operation cycle is repeated until reading is completed.

Therefore, the first information read out from the recording medium by the first processing means is synthesized with the second information input from the outside as the third information. This third information is recorded on the recording medium by the third processing means.

In particular, in the first operation cycle, the first information read out from the recording medium by the first processing means is stored in the storage memory. Then, the first information of the predetermined capacity is read out from the storage memory by the second processing means. The first information thus read out is synthesized with the second information to provide the third information. Thereafter, the third information is written in the empty memory.

The loop processing operation is carried out by the composite operation of the second and third processing means. To be concrete, the third information of the predetermined capacity is read out by the third processing means from the memory in which the third information is stored. The third information thus read out is recorded on the recording medium. At that time, the first information of the predetermined capacity is read out from the storage memory by the second processing means in substantially parallel to the operation of the third processing means. This loop processing is repeated until the storage capacity of the storage memory reaches the predetermined capacity.

After the first operation cycle is ended, the second operation cycle is carried out. In the second operation cycle, the first information read out from the recording medium by the first processing means is stored in the storage memory and the loop processing operation is carried out by the composite operation of the second and third processing means. To be concrete, in this loop processing operation, similarly as described above, the third information of the predetermined capacity is read out by the third processing means from the memory in which the third information is stored. The third information thus read out is stored in the recording medium. At that time, the first information of the predetermined capacity is read out from the storage memory by the second processing means in substantially parallel to the operation done by the third processing means. This loop processing operation is repealed until the storage capacity of the storage memory reaches the predetermined capacity. This second operation cycle is repeated until the reading is completed.

In this case, since the data (first information) recorded on the recording medium is reproduced and the input data (second information) from the outside is synthesized with the first information and again recorded on the recording medium, data can be edited in real time while data is being input. Also, the recording and reproducing on the recording medium can be carried out simultaneously.

Accordingly, when audio data, for example, is edited and recorded, data on the recording medium can be edited and recorded without using two kinds of reproducing and recording drive devices. Further, recording and reproducing within the recording medium become possible.

The recording and reproducing apparatus further includes an abnormality detecting means for detecting an abnormality of the recording and reproducing operation and a reproducing operation stop means for stopping the operation of the first processing means based on an abnormality detecting signal supplied thereto from the abnormality detecting means.

When an abnormality is detected by the abnormality detecting means during at least the first processing means is operated, the reproducing operation stop means stops the operation of the first processing means for a predetermined period of time based on the abnormality detecting signal supplied thereto from the abnormality detecting means.

In this case, data (third information) containing many errors generated when an abnormality occurs can be prevented from being recorded on the recording medium.

The recording and reproducing apparatus further includes a reproducing position correcting means for correcting a reproducing position displaced by a shock based on the abnormality detecting signal supplied thereto from the abnormality detecting means when an abnormality detected by the abnormality detecting means is caused by a shock applied from the outside.

When a shock is applied to the recording and reproducing apparatus from the outside, the abnormality detecting means outputs an abnormality detecting signal. Then, the reproducing position correcting means corrects the reproducing position displaced by the shock based on the abnormality detecting signal supplied thereto from the abnormality detecting means.

In this case, when a shock is applied to the recording and reproducing apparatus from the outside, the operation of the first processing means is caused to stop for a predetermined period of time and during this period of time the reproducing position correcting means corrects the reproducing position shifted due to the shock based on the abnormality detecting signal supplied thereto from the abnormality detecting means. Therefore, even when the reproducing position is displaced by the shock applied from the outside, the reproducing position is corrected to be the correct position after the lapse of a predetermined period. As a consequence, regardless of the external shock occurring while the information signal is being reproduced from the recording medium, the information signal can be reproduced continuously. Thus, the reproducing operation can be carried out more reliably and the reliability of the reproduced data (first information) can be improved.

The recording and reproducing apparatus further includes a recording position correcting means for correcting a recording position displaced by a shock based on the abnormality signal input thereto from the abnormality detecting means when an abnormality detected by the abnormality detecting means is caused by the shock applied from the outside.

When a shock is applied to the recording and reproducing apparatus from the outside, the abnormality detecting means outputs the abnormality detecting signal. Then, the recording position correcting means corrects a recording position displaced by the shock based on the abnormality detecting signal input thereto from the abnormality detecting means.

In this case, when the shock is applied to the recording and reproducing apparatus from the outside, the recording operation stop means stops the third processing means for a predetermine period of time. Accordingly, during this period of time, the recording position correcting means corrects the recording position displaced by the shock based on the abnormality detecting means input thereto. Therefore, even when the recording position is displaced by the shock from the outside, the recording position can be corrected to be the correct position after the lapse of a predetermined period of time so that the information signal can be continuously recorded regardless of the external shock generated when the information signal is recorded on the recording medium. Therefore, the recording operation can be carried out reliably (erroneous recording can be prevented) and the reliability of the recording data (third information) can be improved.

A read-only area and a recordable area can be provided on the recording medium. The first information is used as information on the read-only area and the third information is used as information recorded on the recordable area.

The first processing means reproduces the first information from the read-only area of the recording medium and the third processing means records the third information on the recordable area of the recording medium.

A recording and reproducing method for recording and reproducing an information signal in and from a recording medium comprises a first processing step for reading first information on the recording medium and storing the first information thus read out in a storage memory, a second processing step for reading the first information of a predetermined capacity from the storage memory and writing third information, which results from synthesizing the first information thus read out and second information input from the outside, in an empty memory, and a third processing step for reading third information of a predetermined capacity from the memory in which the third information is stored and recording the third information thus read out in the recording medium wherein after a first operation cycle composed of the first processing step, the second processing step and a loop processing operation for repeating a composite operation of the second and third processing steps until a storage capacity of the storage memory reaches a predetermine capacity is executed once, a second operation cycle composed of the first processing step and a loop processing operation for repeating a composite operation of the second and third processing steps until the storage capacity of the storage memory reaches a predetermined capacity is repeated until a reading is completed.

In the first processing step, the first information on the recording medium is read out and stored in the storage memory. In the second processing step, the first information of the predetermined capacity is read out from the storage capacity and the third information, which results from synthesizing the first information thus read out and the second information input from the outside, is written in the empty memory. In the third processing step, the third information of the predetermined capacity is read out from the memory in which the third information is stored and the third information thus read out is recorded on the recording medium.

After the processing operation of the first processing step is carried out, the processing operation of the second processing step is carried out. Then, the loop processing operation for repeating the composite operation of the second and third processing steps until the storage capacity of the storage memory reaches the predetermined capacity is carried out (first operation cycle). After the processing operation of the first processing step is carried out, a loop processing operation for repeating the composite operation of the second and third processing steps until the storage capacity of the storage memory reaches the predetermined capacity is carried out (second operation cycle).

The above first operation cycle is carried out once. Thereafter, the second operation cycle is repeated until a reading is completed.

Thus, the first information read out from the recording medium by the first processing step is synthesized with the second information input from the outside by the second processing step to provide the third information. This third information is recorded on the recording medium by the third processing step.

In particular, in the first operation cycle, the first information read out from the recording medium by the first processing step is stored in the storage memory. Then, the first information of the predetermined capacity is read out from the storage memory by the second processing step. The first information thus read out is synthesized with the second information to provide the third information. Thereafter, the third information is written in the empty memory.

Then, the loop processing operation of the composite operation of the second and third processing steps is carried out. To be concrete, the third information of the predetermined capacity is read out by the third processing step from the memory in which the third information is stored. The third information thus read out is recorded on the recording medium. At that time, the first information of the predetermined capacity is read out from the storage memory by the second processing step in substantially parallel to the operation done by the third processing step. This loop operation is repeated until the storage capacity of the storage memory reaches the predetermined capacity.

After the first operation cycle is ended, the second operation cycle is carried out. In the second operation cycle, the first information read out from the recording medium by the first processing step is stored in the storage memory and the loop processing operation based on the composite operation of the second and third processing means is carried out. To be concrete, similarly as described above, the third information of the predetermined capacity is read out by the third processing step from the memory in which the above third information is stored. The third information thus read is recorded on the recording medium. At that time, the second processing step is carried out in substantially parallel to the operation done by the third processing step and the first information of the predetermined capacity is read out from the storage memory. This loop processing operation is repeated until the storage capacity of the storage memory reaches the predetermined capacity. Then, the second operation cycle is repeated until a reading is finished.

In this case, since the input data (second information) from the outside is synthesized with the first information and synthesized data (third information) can be recorded on the recording medium while data (first information) recorded on the recording medium is being reproduced, data can be edited in real time while data is being input. Moreover, recording and reproducing on the recording medium can be carried out simultaneously.

Therefore, when audio data, for example, is edited or recorded, data on the recording medium can be edited and recorded without using two kinds of reproducing and recording drive devices. Moreover, the recording and reproducing within the recording medium become possible.

When an abnormality of the recording and reproducing operation is detected during at least the first processing step, the first processing step may be stopped during a predetermined period of time.

In this case, data (first information) containing many errors generated when an abnormality occurred can be prevented from being input to the succeeding signal processing system. Moreover, a time required by the signal processing system for correcting errors can be reduced and a circuit arrangement for correcting errors can be simplified.

When an abnormality of recording and reproducing operation is detected during the third processing step, the third processing step is stopped during a predetermined period of time.

In this case, the data (third information) containing many errors generated when an abnormality occurred can be prevented from being recorded on the recording medium and recorded data on the recording medium can be made highly reliable.

In accordance with application of shock from the outside, an abnormality of recording and reproducing operation is detected and a reproducing position displaced due to the shock is corrected based on the detection of abnormality.

When an abnormality of recording and reproducing operation is caused by a shock applied from the outside, a reproducing position displaced due to the shock can be corrected based on the abnormality of the recording and reproducing operation. Therefore, even when the reproducing position is displaced with application of the shock from the outside, the displaced reproducing position can be corrected to be a correct position after a predetermined period of time. Thus, regardless of the external shock generated while the information signal is being reproduced from the recording medium, the information signal can be reproduced continuously. A reproducing operation can be made reliable and the reliability of reproduced data (first information) can be improved.

When an abnormality of recording and reproducing operation is caused by a shock applied from the outside, a recording position displaced due to the shock can be corrected based on the abnormality of the recording and reproducing operation.

In accordance with application of shock from the outside, an abnormality of recording and reproducing operation is detected and a recording position displaced due to the shock can be corrected based on the detection of abnormality.

In this case, when a shock is applied to the recording and reproducing apparatus from the outside, the third processing step is stopped during a predetermined period of time. During this period, the recording position displaced due to the above shock can be corrected based on the detection of abnormality generated in accordance with this shock. Therefore, even when the recording position is displaced due to the shock applied from the outside, the recording position is corrected to be the correct position after the lapse of a predetermined period of time. Thus, regardless of the external shock generated during the information signal is being recorded on the recording medium, the information signal can be recorded on the recording medium continuously. As a result, a recording operation can be carried out reliably and a reliability of the recorded data (third information) can be improved.

The first information may be read out from the read-only area of the recording medium and the third information may be recorded on the recordable area of the recording medium.

The first information can be reproduced from the read-only area of the recording medium by executing the first processing step. The third information can be recorded on the recordable area of the recording medium by executing the third processing step.

DETAILED DESCRIPTION OF THE PREFERRED EMBODIMENT

An embodiment in which a recording and reproducing apparatus according to the present invention is applied to a disk drive using a magnetooptical disk as a recording medium will be described with reference to FIGS. 1 to 6.

Figure 1:
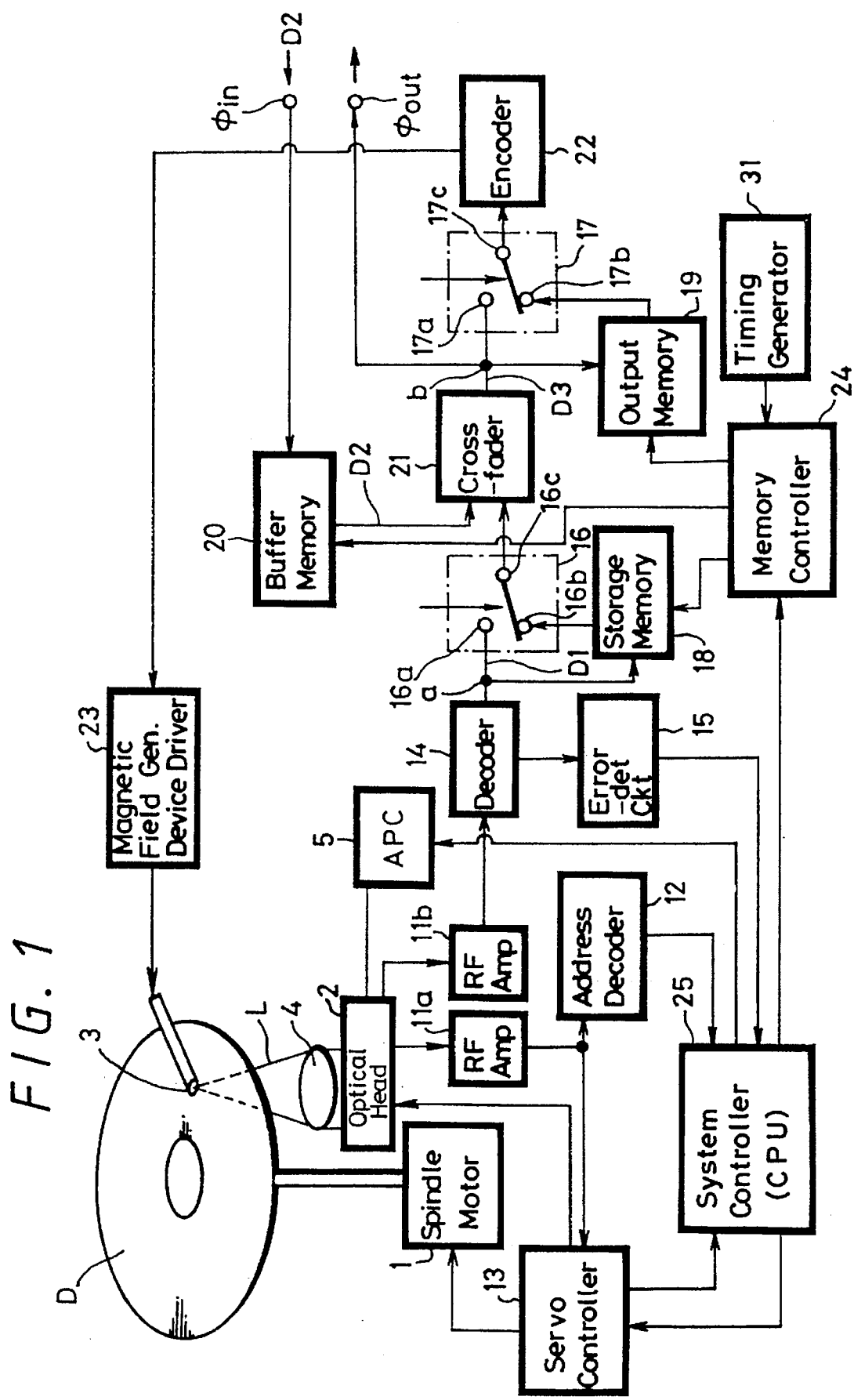
FIG. 1 is a block diagram showing an embodiment wherein a recording and reproducing apparatus according to the present invention is applied to a disk drive using a magnetooptical disk as a recording medium.

FIG. 1 of the accompanying drawings shows in block form a recording and reproducing apparatus according to the present invention. As shown in FIG. 1, the recording and reproducing apparatus comprises a disk cartridge holder (not shown) with a magnetooptical disk D (diameter is about 64 mm) corresponding to a magnetic modulation system rotatably stored therein, a spindle motor 1 for rotating the magnetooptical disk D stored within the disk cartridge holder, an optical head 2 for reproducing an information signal from the magnetooptical disk D, and a recording magnetic field generating device (incorporating therein an excitation coil) 3 for applying a recording magnetic field to the magnetooptical disk D rotated by the spindle motor 1 to magnetize a vertical magnetization layer (recording layer) of the magnetooptical disk D at its portion irradiated with laser beam L from the optical head 2 in response to a recording signal. The disk cartridge is not shown in FIG. 1 in order to simplify the sheet of drawing.

The disk cartridge holder includes therein a known shutter opening and closing mechanism for opening and closing a shutter (not shown) of the disk cartridge.

Therefore, when the disk cartridge is inserted into the disk cartridge holder, the shutter opening and closing mechanism opens the shutter. At the time the shutter is fully opened, or the disk cartridge is completely inserted into the disk cartridge holder, the loading of the disk cartridge into the recording and reproducing apparatus is finished.

The spindle motor 1 is disposed at the lower position corresponding to the central portion of the loaded disk cartridge. A turntable (not shown) with a magnet is attached to an upper end of a motor shaft of the spindle motor 1.

After the disk cartridge has been loaded, the turntable of the spindle motor 1 enters into the disk cartridge through the rear opening portion of the disk cartridge. At that time, the upper surface of the turntable and the center hub of the magnetooptical disk D stored within the disk cartridge are closely contacted with each other by an attraction of the magnet and then held. Thus, the magnetooptical disk D stored within the disk cartridge is loaded on the spindle motor 1.

The optical head 2 is disposed at the lower position of the rear opening portion exposed to the inside of the recording and reproducing apparatus. The optical head 2 can be moved by an optical head slide mechanism (not shown) mainly composed of a linear motor and a guide shaft, for example, in the radius direction of the magnetooptical disk D in the disk cartridge.

The optical head 2 includes an objective lens 4 for focusing laser beam L from a laser light source (not shown) on a recording layer of the magnetooptical disk D. The objective lens 4 is moved very slightly by a two-dimensional actuator (not shown) in the direction in which it comes close to or away from the magnetooptical disk D and in the radius direction of the magnetooptical disk D. The two-dimensional actuator is formed of a magnetic circuit composed of a focusing coil, a tracking coil and a magnet (not shown).

The optical head 2 includes an optical system formed as a unit composed of the laser light source (not shown) formed of a semiconductor laser as a light source for emitting a laser beam L, the objective lens 4 for focusing laser beam L on the magnetooptical disk D and a photodetector (not shown) for detecting returned light (reflected-back light) reflected on the magnetooptical disk D and converting detected returned light into an electrical signal (detected signal) of current level corresponding to the intensity of detected returned light. The optical head 2 can be moved by the optical head slide mechanism along the radius direction of the magnetooptical disk D.

The optical system of the optical head 2 comprises, in addition to the above optical assemblies, a collimator lens for collimating laser beam L emitted from the laser light source to provide parallel beam, a phase diffraction grating for separating the laser beam L to provide at least three light bundle components and a beam splitter for separating the laser beam L emitted from the laser light source and returned light from the magnetooptical disk D, although not shown.

In the light path of returned light, there are disposed a focusing lens for converging the returned light on the photodetector and a multilens composed of a cylindrical lens and a concave lens for adjusting a focal length of the returned light and generating astigmatism, although not shown.

On the opposite side of the focusing lens of the beam splitter, there is disposed a monitoring photodetector (not shown) for detecting a part (light component reflected on a boundary surface of the beam splitter) of laser beam L (P-polarized light) from the laser light source and converting a detected light component into an electrical signal (detected signal) of output level (current level) corresponding to an intensity of the detected light component.

Since characteristics of the beam splitter are determined such that a transmittance TP of P-polarized light is selected to be 80% and a reflectivity RS of S-polarized light is selected to be 100%, 20% of laser beam L incident on the beam splitter from the laser light source is reflected on the boundary surface of the beam splitter and introduced into the monitoring photodetector.

A light amount controller 5 is connected to the rear stage of the monitoring photodetector. The light amount controller 5 is often referred to an automatic power control (APC) circuit and outputs a control signal to the laser light source based on the detected signal from the photodetector so that the laser light source can be oscillated stably.

Specifically, the APC circuit 5 outputs a control signal to the laser light source such that an output (intensity) of laser beam L emitted from the laser light source becomes equal to set value data supplied from a system controller 25, which will be described later on, and that the laser light source can be oscillated stably. A value indicated by the set value data from the system controller 25 is varied when an information signal is played back from the magnetooptical disk D or when an information signal is recorded on the magnetooptical disk D. The above value is set such that the intensity of the laser beam used when the information signal is recorded on the magnetooptical disk D becomes larger than that of the laser beam used when the information signal is reproduced from the magnetooptical disk D.

A magnetic field generating device 3 for generating a recording magnetic field is disposed at the upper position of the upper surface opening portion exposed to the inside of the recording and reproducing apparatus. The magnetic field generating device 3 is moved in the upper and lower direction, i.e., moved close to or away from the upper surface opening portion of the disk cartridge by a known elevating mechanism (not shown) mainly composed of a stepper motor and a rotation-to-linear motion converting mechanism. Further, the magnetic field generating device 3 is moved by an interlocking mechanism (not shown) in the radius direction of the magnetooptical disk D in unison with the optical head 2.

Figure 2A:
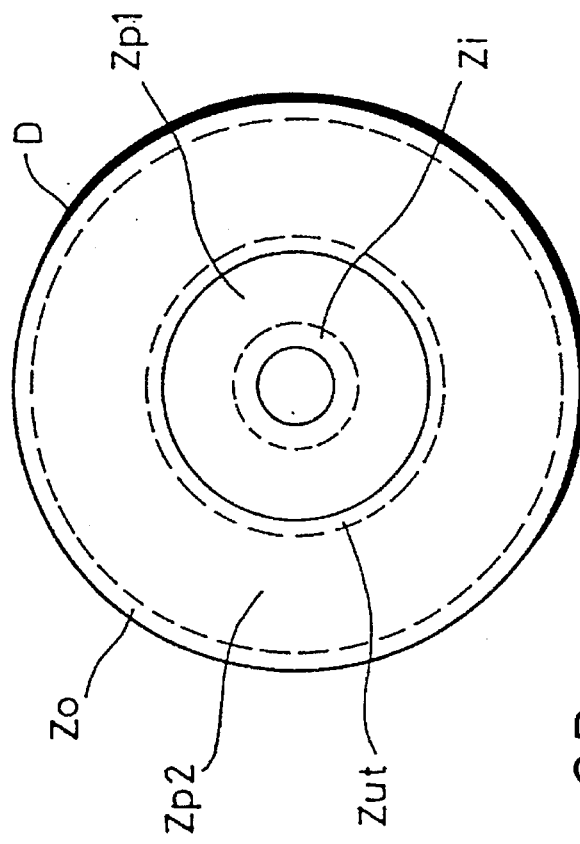
FIGS. 2A and 2B are schematic diagrams showing an arrangement of a magnetooptical disk used in the recording and reproducing apparatus according to the present invention.
Figure 2B:
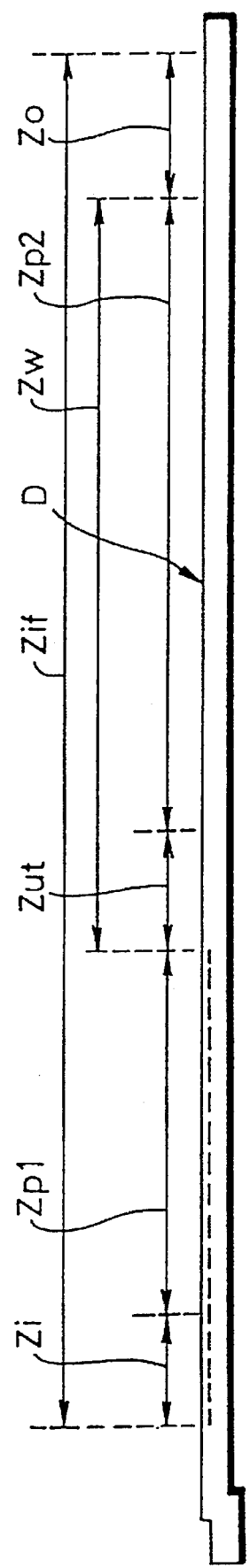

As shown in FIGS. 2A and 2B, the magnetooptical disk D is of a hybrid type magnetooptical disk such that a lead-in area Zi is allocated to the innermost periphery of information area Zif, a lead-out area Zo is allocated to the outermost periphery and a first program area Zp1 based on pre-pits (pit information recorded by concavities and convexities) and a recordable area Zw based on a magnetooptical recording layer are formed between the lead-in area Zi and the lead-out area Zo.

Attribute data of the magnetooptical disk D (disk type and track information), i.e., TOC data is recorded on the lead-in area Zi, for example, of the magnetooptical disk D by pit information based on concavities and convexities.

A TOC data area in which the user can record attribute data of the magnetooptical disk D, i.e., UTOC area Zut is allocated to the inner peripheral side area (area adjoining the first program area Zp1) of the recordable area Zw. The other of Zp2 is allocated to a second program area.

A circuit system of the recording and reproducing apparatus comprises, as shown in FIG. 1, first and second RF amplifiers 11a, 11b, an address decoder 12, a servo controller 13, a decoder 14, an error-detecting circuit 15, first and second switching circuits 16, 17, a storage memory 18, an output memory 19, a buffer memory 20, a cross-fader 21, an encoder 22, a magnetic field generating device driver 23, a memory controller 24 and a system controller 25 for controlling the above-mentioned respective circuits.

The first RF amplifier 11a amplifies a tracking error signal, a focus error signal and a subcode signal in the reproduced signal from the optical head 2. The second RF amplifier 11b amplifies a data signal in the reproduced signal from the optical head 2. The address decoder 12 decodes the subcode signal supplied thereto from the first RF amplifier 11a to provide address data.

The encoder 22 encodes recording data supplied thereto in a coding fashion such as an error-correcting code to provide recording information data. Then, the encoder 22 further converts converted data into binary data and outputs the binary data as an on-off signal.

The magnetic field generating device driver 23 is responsive to the on-off signal supplied thereto from the encoder 22 to switch the direction in which a current is supplied to the excitation coil (not shown) disposed within the recording magnetic field generating device 3 in the positive or negative direction. To be concrete, when a current is flowed to the excitation coil in the positive direction, the second program area Zp2 in the magnetooptical disk D is magnetized in the positive direction, for example, at its portion of which temperature is higher than a Curie temperature with irradiation of laser beam from the optical head 2. When on the other hand a current is flowed to the excitation coil in the negative direction, the above-mentioned portion is magnetized in the negative direction.

Then, a magnetized information reproduced signal recorded on the second program area Zp2 of the magnetooptical disk D can be obtained by detecting the Kerr rotation angle in the reflected light bundle modulated at the portion magnetized in the positive or negative direction with irradiation of reproducing laser beam L from the optical head 2 by a photodetector formed of a pn junction assembled into the optical head 2.

From pit information recorded on the lead-in area Zi and the first program area Zp1 of the magnetooptical disk D, with irradiation of the reproducing laser beam, the photodetector can generate a detected signal having signal level corresponding to the intensity of the reflected light bundle.

Although not shown, the servo controller 13 incorporates therein a focus servo circuit, a tracking servo circuit, a spindle servo circuit and a motor servo circuit for servo-controlling a motor that is used as a drive source for driving various moving mechanisms. Data (servo gain, etc.) concerning servo-control, a servo drive control signal such as a drive signal from the system controller and various error signals from the first RF amplifier 11a are input to these servo circuits.

Within the servo controller 13, a spindle servo circuit (not shown) drives the spindle motor 1 based on the servo drive control signal supplied thereto from the system controller 25 to rotate the magnetooptical disk D resting on the turntable in a constant linear velocity (CLV) or constant angular velocity (CAV) fashion. The system controller 25 generates the servo drive control signal based on a clock signal which results from multiplying a pulse signal, generated when a clock pit formed together with a servo pit on the servo area is detected, by a phase-locked loop (PLL).

Also within the servo controller 13, a focus servo circuit (not shown) adjusts the focus by moving the objective lens 4 close to or away from the magnetooptical disk D by driving and controlling the two-dimensional actuator of the optical head 2 on the basis of the focus error signal supplied thereto from the first RF amplifier 11a, i.e., a signal which results from calculating a detected signal of level corresponding to an intensity of reflected light reflected from a mirror plane with irradiation of laser beam on the mirror plane formed on the magnetooptical disk D by the first RF amplifier 11a in a predetermined calculation fashion.

Further within the servo controller 13, the tracking servo circuit (not shown) adjusts tracking by moving the objective lens 4 in the radius direction of the magnetooptical disk D by driving and controlling the two-dimensional actuator of the optical head 2 based on the tracking error signal supplied thereto from the first RF amplifier 11a, i.e., a signal which results from calculating a detected signal, generated when the servo pit within the servo area formed on the magnetooptical disk D is detected, by the first RF amplifier 11a in a predetermined calculation fashion.

The decoder 14 converts the reproduced signal supplied thereto from the first RF amplifier 11b, i.e., a signal which results from calculating a P-polarized light component and a S-polarized light component of reflected light modulated in response to magnetization information recorded on the recording layer of the magnetooptical disk D, into digital data. Further, the decoder 14 decodes the digital data with the error-correcting code or the like added to provide decoded digital data and outputs the decoded digital data as reproduced data (first information) D1. The reproduced data (first information) D1 from the decoder 14 is transmitted through a contact a to the first switching circuit 16 and the storage memory 18.

The error-detecting circuit 15 detects an error code of the signal decoded by the decoder 14 and outputs an error signal to the system controller 25 based on the detected error code.

Address data from the address decoder 12 is supplied to the system controller 25, in which it is used to control rotation of the spindle motor 1 and to control a scanning position of the optical head 2 upon seeking.

The storage memory 18 and the output memory 19 are each composed of a semiconductor memory, e.g., dynamic random-access memory (DRAM) with a storage capacity ranging from about 10 megabits to 20 megabits. When audio information is processed, a series of operations, such encoding of audio data to the semiconductor memory, searching of a track to be recorded, recording of an EFM (eight-to-fourteen modulated) signal or searching of a track from which data is to be read out should be ended until the next data is read out. According to the present invention, a DRAM with a storage capacity of 10 megabits can store audio data for about 30 seconds wherein a series of operations can be carried out.

The buffer memory 20 is composed of a DRAM with a storage capacity ranging from about 10 megabits to 20 megabits similarly to the storage memory 18 and the output memory 19. The buffer memory 20 temporarily stores external data (second information) supplied to an external input terminal φin and then supplies the external data D2 to the succeeding cross-fader 21.

Data is written in and read out from the storage memory 18, the output memory 19 and the buffer memory 20 under control of the memory controller 24 based on a command signal from the system controller 25.

The cross-fader 21 cross-fades the first information D1 supplied thereto from the decoder 14 through the first switching circuit 16 and the second information D2 supplied thereto from the data buffer 20.

The first switching circuit 16 comprises a first fixed contact 16a connected to the output side of the decoder 14, a second fixed contact 16b connected to the data output side of the storage memory 18 and a movable contact 16c connected to the input side of the cross-fader 21. The first switching circuit 16 selectively connects the movable contact 16c to the first fixed contact 16a or the second fixed contact 16b based on a control signal supplied thereto from the system controller 25.

A second switching circuit 17 comprises a first fixed contact 17a connected to the output side of the cross-fader 21, a second fixed contact 17b connected to the data output side of the output memory 19 and a movable contact 17c connected to the input side of the encoder 22. The second switching circuit 17 selectively connects the movable contact 17c to the first fixed contact 17a or the second fixed contact 17b based on a control signal supplied thereto from the system controller 25.

Synthesized data (third information) D3 output from the cross-fader 21 is supplied through a contact b to the first fixed contact 17a of the second switching circuit 17, an output terminal φout and the output memory 19.

The operation of the recording and reproducing apparatus according to the present invention will be described. Initially, pit information recorded on the first program area Zp1 formed on the magnetooptical disk D is converted by the optical system of the optical head 2 into an electrical signal (detected signal). Address data contained in the sub-code is transmitted through the first RF amplifier 11a to the address decoder 12, in which it is decoded and input to the system controller 25.

When a tracking error and a focus error are detected, the error signal of the tracking error and the focus error is supplied to the servo controller 13 by which a servo control signal based on the error signal is generated and output to the optical head 2 and the spindle motor 1. The servo controller 13 supplies a CLV (constant linear velocity) control signal to the spindle motor 1 under control of the system controller 25, thereby controlling a rotational speed of the magnetooptical disk D. Further, the system controller 25 controls the APC circuit 5 so as to modulate the laser beam output to the optical head 2.

A data signal from the optical head 2 is supplied through the second RF amplifier 11b to the decoder 14. The decoder 14 decodes the data signal supplied thereto in an EFM demodulation fashion and outputs decoded data as reproduced data. The reproduced data from the decoder 14 is stored in the storage memory 18 as the first information D1 read out from the magnetooptical disk D.

Under control of the system controller 25, the first switching circuit 16 connects the movable contact 16c to the second fixed contact 16b to allow the first information D1 stored in the storage memory 18 to be input to the cross-fader 21.

The data buffer (buffer memory) 20 temporarily stores therein the external input data supplied to the external input terminal φin and transmits the stored external input data to the cross-fader 21 based on a timing signal input thereto from the system controller 25.

The cross-fader 21 synthesizes the first information supplied thereto from the storage memory 18 and the second information D2 supplied thereto from the data buffer 20 and outputs synthesized information as the third information D3. The third information D3 from the cross-fader 21 is supplied through the contact b to the output terminal φout, the output memory 19 and the second switching circuit 17.

When the first information D1 is directly obtained from the decoder 14 and directly synthesized with the second information, the first switching circuit 16 connects the movable contact 16c to the first fixed contact 16a under control of the system controller 25.

When on the other hand the first information is obtained from the storage memory 18 and synthesized with the second information D2 at a proper timing, the first switching circuit 16 connects the movable contact 16c to the second fixed contact 16b under control of the system controller 25.

When the third information D3 output from the cross-fader 21 is directly supplied to the encoder 22, the second switching circuit 17 connects the movable contact 17c to the first fixed contact 17a under control of the system controller 25. When on the other hand the third information D3 is supplied through the output memory 19 to the encoder 22 at a proper timing, the second switching circuit 17 connects the movable contact 17c to the second fixed contact 17b under control of the system controller 25.

The first and second switching circuits 16 and 17 can be changed-over manually (operating selecting switches on the console of the recording and reproducing apparatus) or changed-over automatically depending on the kinds of reproduced data (first information D1). When the first and second switching circuits 16 and 17 are changed-over automatically, the system controller 25 discriminates the types of reproduced data based on address information output from the address decoder 12 and can automatically change-over the first and second switching circuits 16 and 17 based on a discriminated result.

The third information D3 supplied to the encoder 22 is encoded by the encoder 22 and supplied to the magnetic field generating device driver 23 connected to the encoder 22 as the EFM signal (on-off signal). The magnetic field generating device driver 23 switches the supplying direction of the excitation current to the positive or negative direction in response to the EFM signal supplied thereto, whereby the magnetic field generating device 3 generates an external magnetic field of positive or negative direction in response to the EFM signal supplied thereto.

At that very moment, the optical head 2 irradiates laser beam L of level corresponding to a recording intensity on the magnetooptical disk D to orient the magnetization direction of the irradiated portion in the external magnetic field, resulting in the EFM signal being recorded on the second program area Zp2 of the magnetooptical disk D.

An operation of the recording and reproducing apparatus according to the present invention will be described more in detail. In this case, the manner in which data is accessed to the storage memory 18 and the output memory 19 under the control of the memory controller 24 will be mainly described with reference to FIG. 3 also.

Figure 3:
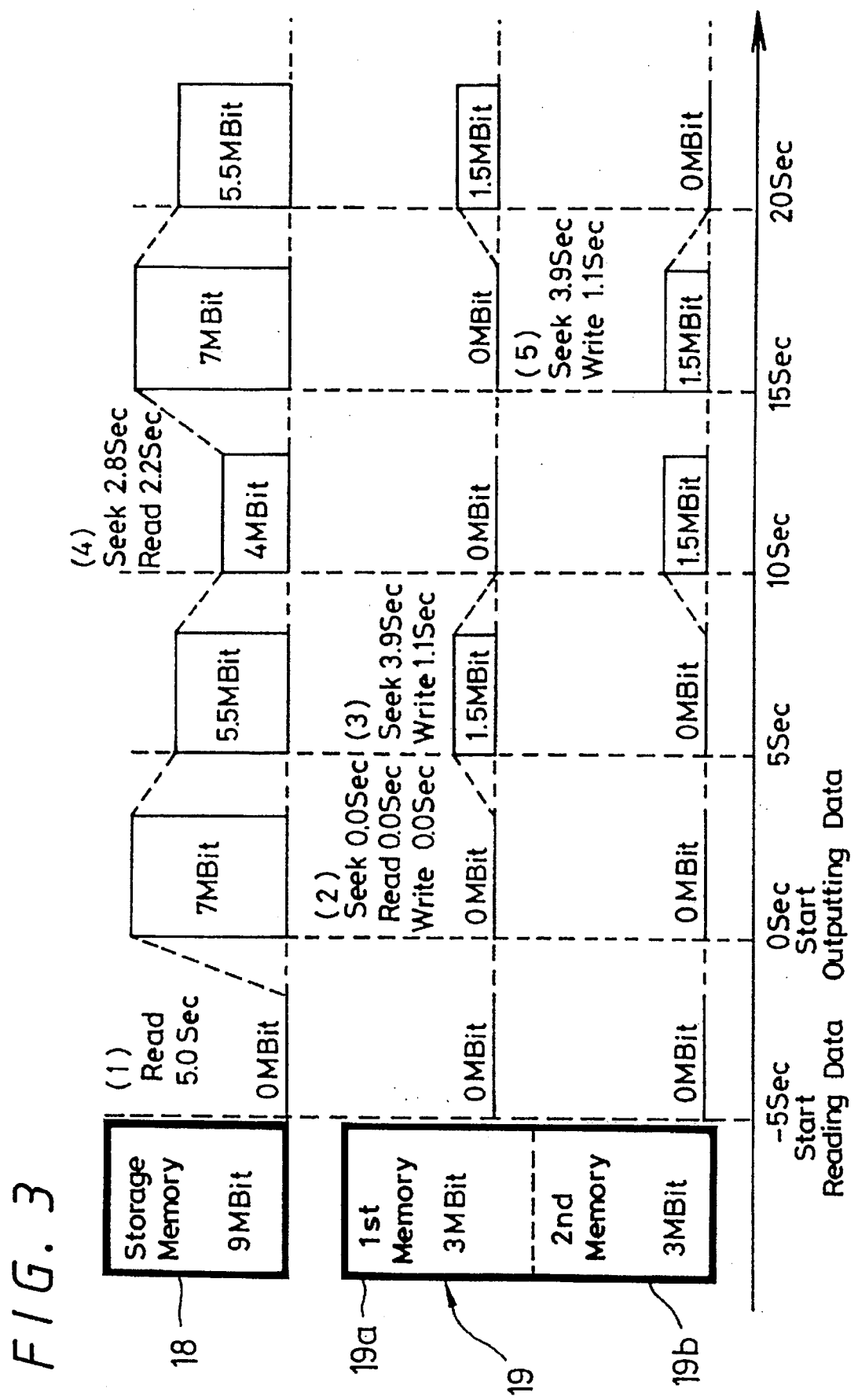
FIG. 3 is an explanatory diagram showing an access operation (read/write operation in real time) to memories of the recording and reproducing apparatus according to the present invention.

In FIG. 3, in order to understand the operation of the recording and reproducing apparatus clearly, the memory area of the output memory 19 is divided into two memory areas (referred to hereinafter as "first memory 19a" and "second memory 19b"). The storage capacity of the storage memory 18 is 9 megabits and that of the output memory 19 is 6 megabits. A read/write transfer rate at which data is read out from and written in the magnetooptical disk D is 1.4 megabits/second. A transfer rate at which data is output to the output terminal φout is 0.3 megabits/second.

The first switching circuit 16 connects the movable contact 16c to the second fixed contact 16b to allow the output of the storage memory 18 to be input to the cross-fader 21. The second switching circuit 17 connects the movable contact 17c to the second fixed contact 17b to allow the output of the output memory 19 to be input to the encoder 22.

The recording and reproducing apparatus starts reading the first information D1 from the first program area Zp1 of the magnetooptical disk D in order to stock the data (first information) D1 recorded on the magnetooptical disk D and the external input data (second information) D2 supplied thereto from the external input terminal φin, i.e., edit data composed of the first information D1 and the second information D2 before 5 seconds before data starts being output.

In a first operation (1), at the time 5 seconds before data starts being output, an interrupt signal from a timer (not shown) disposed within the system controller 25 or connected to the outside thereof sequentially activates a series of program groups registered on the system controller 25 for controlling the memory controller 24 and the servo controller 13.

When these program groups are activated, the servo controller 13 is energized to move the optical head 2 to the position corresponding to the start address of the first information D1 in the first program area Zp1 on the magnetooptical disk D. Then, the optical head 2 is activated. When the optical head 2 is activated, a reproduced signal concerning the first information D1 is obtained from the optical head 2 and converted by the decoder 14 to reproduced data, i.e., first information D1.

The system controller 25 outputs a write request signal for the storage memory 18 to the memory controller 24. The memory controller 24 is triggered by the write request signal supplied thereto from the system controller 25 and writes the first information D1 output from the decoder 14 in the storage memory 18 in the sequential order of addresses while updating the write address in accordance with the write clock from the timing generator 31.

If a read time for reading data from the first program area Zp1 on the magnetooptical disk D is set to 5 seconds as shown in FIG. 3, then the first information D1 of 7 megabits is stored in the storage memory 18 at the time data starts being output because the read transfer rate is 1.4 megabits.

In a second operation (2), in the letter portion of 5 seconds after data starts being output, the system controller 25 outputs a request signal for reading the first information D1 from the storage memory 18 and a request signal for reading the second information D2 from the data buffer 20 to the memory controller 24.

The memory controller 24 outputs a read enable signal to the storage memory 18 and the data buffer 20 based on the read request signal from the memory controller 25 and updates the read address in accordance with the read clock supplied thereto from the timing generator 31, The storage memory 18 and the data buffer 20 activate their read circuits based on the read enable signal input thereto from the memory controller 24 and read the first information D1 and the second information D2 of 1.5 megabits each from their memory areas in the order of read addresses.

The first information D1 from the storage memory 18 is input through the first switching circuit 16 to one input terminal of the cross-fader 21. The second information D2 from the data buffer 20 is input to the other input terminal of the cross-fader 21, whereby the first information D1 and the second information D2 are cross-faded. Then, the cross-fader 21 outputs the first information D1 and the second information D2 thus cross-faded as third information D3.

The third information D3 from the cross-fader 21 is output to the outside through the contact b and the output terminal φout and also supplied through the contact b to the output memory 19. The memory controller 24 outputs a write enable signal to the output memory 19 based on a write request signal for writing data in the output memory 19 from the system controller 25. Moreover, the memory controller 24 updates a write address in accordance with the write clock supplied thereto from the timing generator 31.

In particular, according to this embodiment, since the memory area of the output memory 19 is logically divided into the two memory areas (first memory 19a and second memory 19b), the write request signal output from the system controller 25 to the memory controller 24 has a signal format indicative of whether the write request signal is for the first memory 19a or the second memory 19b.

The signal format of the write request signal is arranged such that the memory controller 24 can select the memory 19a or 19b corresponding to bit address "0" by searching a memory flag state registered in the memory of the system controller 25 and which is used to confirm by bit information whether data is shared by the memory 19a or 19b of the output memory 19, set bit state corresponding to 0th bit address (corresponding to the first memory 19a) and 1st bit address (corresponding to the second memory 19b). In the initial stage, since data is not shared in any of the first and second memories 19a and 19b, the write request signal of the signal format for selecting the first memory 19a, for example, is output from the system controller 25 to the memory controller 24.

The memory controller 24 discriminates the writing in the first memory 19a and the writing in the second memory 19b from each other based on the signal format of the write request signal input thereto from the system controller 25. Then, the memory controller 24 updates the write address from the start address corresponding to the memory 19a or 19b in response to a discriminated result.

In the initial stage, since the write request signal is indicative of a write request in the first memory 19a, the third information D3 is written in the first memory 19a. During 5 seconds after data starts being output, the first information D1 and the second information D2 of 1.5 megabits each are read out from the storage memory 18 and the data buffer 20. Then, the cross-fader 21 cross-fades the first information D1 and the second information D2 to provide the third information D3 of 1.5 megabits, which is written in the first memory 19a of the output memory 19.

Therefore, at the time 5 seconds has passed after data started being output, the first information D1 of 5.5 megabits is stored in the storage memory 18 and the third information D3 of 1.5 megabits is stored in the first memory 19a of the output memory 19. No information is stored in the second memory 19b of the output memory 19 and the second memory 19b is kept empty.

In a third operation (3) at the time 5 seconds has passed after data started being output, the system controller 25 outputs a seek operation request signal to the servo controller 13 so that the optical head 2 (and the magnetic field generating device 3) is moved over the position corresponding to the second program area Zp2 on the magnetooptical disk D under control of the servo controller 13.

The servo controller 13 drives the optical head slide mechanism (not shown) based on the seek operation request signal supplied thereto from the system controller 25 to move the optical head 2 over the second program area Zp2 on the magnetooptical disk D. Moreover, the servo controller 13 reads address data of destination position and controls the optical head slide mechanism so that the optical head slide mechanism, while being servo-controlled, moves the optical head 2 (and the magnetic field generating device 3) over the first track in the second program area Zp2, for example. A seek time is 3.9 seconds.

While the optical head 2 is seeking an appropriate position, the system controller 25 outputs a read request signal for reading the third information D3 from the output memory 19 (more precisely, the first memory 19a) to the memory controller 24.

The memory controller 24 outputs a read enable signal to the output memory 19 based on the read request signal supplied thereto from the system controller 25 and updates the read address corresponding to the first memory 19a in accordance with the read clock supplied thereto from the timing generator 31.

The output memory 19 activates the read circuit thereof based on the read enable signal supplied thereto from the memory controller 24 and reads the third information D3 of 1.5 megabits from the first memory 19a in the sequential order of addresses. The third information D3 read out from the first memory 19a is supplied through the second switching circuit 17 to the encoder 22.

The encoder 22 encodes the third information D3, i.e., error-corrects the third information D3 to provide recording information data. Further, the encoder 22 converts the recording information data to provide eight-to-fourteen-modulated binary data and outputs the binary data as an on-off signal.

The on-off signal output from the encoder 22 is recorded in the second program area Zp2 on the magnetooptical disk D as edited data through the magnetic field generating device driver 23 and the magnetic field generating device 3. In other words, the third information D3 is recorded in the second program area Zp2 on the magnetooptical disk D.

The third information D3 is recorded on the magnetooptical disk D for 1.1 seconds, for example, after the seek time of 3.9 seconds. Therefore, during a time period of 5 to 10 seconds after data started being output, the third information D3 (edited information), which is synthesized information of the first information D1 (information read out from the magnetooptical disk) and the second information (external input information), is recorded on the magnetooptical disk D.

While the third information D3 is being recorded on the magnetooptical disk D, the system controller 25 outputs a read request signal for reading the first information D1 from the storage memory 18 and a read request signal for reading the second information from the data buffer 20 to the memory controller 24.

The memory controller 24 outputs read enable signals to the storage memory 18 and the data buffer 20 based on the read request signal supplied thereto from the system controller 25 and updates the read address in accordance with the read clock supplied thereto from the timing generator 31.

The storage memory 18 and the data buffer 20 activate their read circuits based on the read enable signals supplied thereto from the memory controller 24 to read the first information information D1 and the second information D2 from the respective memory areas in the sequential order of read addresses.

The cross-fader 21 cross-fades the first information D1 supplied thereto from the storage memory 18 and the second information D2 supplied thereto from the data buffer 20 to output the third information D3. The third information D3 from the cross-fader 21 is output through the contact b and the output terminal φout to the outside and also supplied through the contact b to the output memory 19.

The memory controller 24 outputs the write enable signal to the output memory 19 based on a write request signal (write request signal having a signal format for selecting the empty second memory 19b because data is being transferred from the first memory 19a) for the output memory 19 supplied thereto from the system controller 25. Moreover, the memory controller 24 updates the write address corresponding to the second memory 19b in accordance with the write clock supplied thereto from the timing generator 31, thereby the third information D3 being written in the second memory 19b. The third information D3 is written in the second memory 19b over a time period (1.1 seconds) during which the third information D3 is recorded on the magnetooptical disk D.

Therefore, at the time 10 seconds are passed after data started being output, first information D1 of 4 megabits is stored in the storage memory 18 and third information D3 of 1.5 megabits is stored in the second memory 19b. No information is stored in the first memory 19a and the first memory 19a is kept empty.

In a fourth operation (4), at the time the third information finishes being written in the magnetooptical disk D (i.e., at the time 10 seconds are passed after data started being output), the system controller 25 outputs a seek operation request signal to the servo controller 13 so that the optical head 2 (and the magnetic field generating device 3) is moved over the position corresponding to the next read position in the first program area Zp1 on the magnetooptical disk D under control of the servo controller 13.

The servo controller 13 drives the optical head slide mechanism (not shown) based on the seek operation request signal supplied thereto from the system controller 25 to move the optical head 2 over the position corresponding to the first program area Zp1 on the magnetooptical disk D. Also, the servo controller 13 reads out address data of destination position and servo-controls the optical head slide mechanism to move the optical head 2 (and the magnetic field generating device 3) over the position corresponding to the next read address. A seek time of this seek operation is 2.8 seconds, for example. Then, data starts being read out from the magnetooptical disk D at the above address position.

At that very moment, the system controller 25 outputs a write request signal for the storage memory 18 to the memory controller 24. The memory controller 24 is triggered by the write request signal supplied thereto from the system controller 25 to update the write address in accordance with the write clock supplied thereto from the timing generator 31 and writes the first information D1 output thereto from the decoder 14 in the storage memory 18 in the sequential order of addresses.

Since the seek operation time is 2.8 seconds, the data read time from the first program area Zp1 on the magnetooptical disk D is 2.2 seconds as the remaining time to the next cycle. In this case, although 2.2 seconds×1.4 megabits/second= 3.08 megabits, the data read time should be selected to be 3 megabits according to this embodiment. Accordingly, when data is written in the storage memory 18, the first information D1 of 7 megabits is stored again in the storage memory 18.

In a fifth operation (5), at the time 15 seconds are passed since data started being output, the system controller 23 outputs a seek operation request signal to the servo controller 13 such that the optical head 2 (and the magnetic field generating device 3) is moved over the next recording position in the second program area Zp2 on the magnetooptical disk D under control of the servo controller 13.

The servo controller 13 is energized by the seek operation request signal input thereto from the system controller 25 so as to drive the optical head slide mechanism to move the optical head 2 over the second program area Zp2 on the magnetooptical disk D. Also, the servo controller 13 reads address data of the position to which the optical head is moved next and allows the optical head slide mechanism to move the optical head 2 (and the magnetic field generating device 3) over the position corresponding to the next recording position in the second program area Zp2. A time required by the seek operation is 3.9 seconds.

While the optical head 2 is seeking the target position, the system controller 25 outputs a read request signal for reading the third information D3 from the output memory 19 (precisely, the second memory 19b) to the memory controller 24.

The memory controller 24 outputs a read enable signal to the output memory 19 based on the read request signal supplied thereto from the system controller 25. Also, the memory controller 24 updates the read address corresponding to the second memory 19b in accordance with the read clock supplied thereto from the timing generator 31.

The output memory 19 activates the read circuit based on the read enable signal supplied thereto from the memory controller 24 and reads out the third information D3 of 1.5 megabits from the second memory 19b in the sequential order of read addresses. The third information D3 read out from the second memory 19b is supplied through the second switching circuit 17 to the encoder 22.

The third information supplied to the encoder 22 is encoded in some suitable methods, such as error-correction and modulated in an EFM fashion by the encoder 22 and then output from the encoder 22 to the magnetic field generating device driver 23 as an on-off signal, whereby the present third information D3 is written in the second program area Zp2 of the magnetooptical disk D through the magnetic field generating device driver 23 and the magnetic field generating device 3.

The third information D3 is recorded on the magnetooptical disk D for 1.1 seconds, for example, after the seek operation of 3.9 seconds. Therefore, for 15 to 20 seconds after data started being output, the third information D3 stored in the second memory 19b is recorded on the magnetooptical disk D.

On the other hand, while the third information D3 is being recorded on the magnetooptical disk D, the read request signal for reading the first information D1 from the storage memory 18 and a read request signal for reading the second information D2 from the data buffer 20 are output from the system controller 25 to the memory controller 24.

The memory controller 24 outputs the read enable signals to the storage memory 18 and the data buffer 20 based on the read request signals supplied thereto from the system controller 25 and updates the read addresses in accordance with the read clock supplied thereto from the timing generator 31.

The storage memory 18 and the data buffer 20 activate their read circuits based on the read enable signals supplied thereto from the memory controller 24 and read the first information D1 and the second information D2 from the memory areas thereof in the sequential order of read addresses.

Then, the cross-fader 21 cross-fades the first information D1 from the storage memory 18 and the second information D2 from the data buffer 20 to output the third information D3. The third information D3 from the cross-fader 21 is output through the contact b and the output terminal $\phi$out to the outside and also supplied through the contact b to the output memory 19.

The memory controller 24 outputs a write enable signal based on the write request signal (write request signal having a signal format capable of selecting the empty first memory 19a because data is being transferred from the second memory 19b) supplied from the system controller 25 to the output memory 19, and updates a write address corresponding to the first memory 19a in accordance with a write clock supplied thereto from the timing generator 31, whereby the third information D3 is written in the first memory 19a. The third information D3 is written in the first memory 19a over a time (1.1 seconds ) during which the third information D3 is recorded in the magnetooptical disk D.

Accordingly, at the time 20 seconds are passed after data started being output, the first information D1 of 5.5 megabits is stored in the storage memory 18 and the third information D3 of 1.5 megabits is stored in the first memory 19a. No information is stored in the second memory 19b and the second memory 19b is kept empty.

The series of operations (3) to (5) described above are sequentially repeated, whereby the first information D1 recorded in the first program area Zp1 on the magnetooptical disk D is read and synthesized with the second information D2 input from the outside, thereby being sequentially recorded in the second program area Zp2 on the same magnetooptical disk D as the third information D3.

The series of operations are ended when a read stop signal, which was generated by operating a stop button, is supplied from a key input means (not shown), for example, to the system controller 25. To be concrete, the read stop signal is supplied to the system controller 25, for example, whereby the system controller 25 supplies an instruction signal for deenergizing the optical head 2 to the servo controller 13. Also, a control stop signal is output to the memory controller 24, thereby a series of operations being ended.

As described above, in the recording and reproducing apparatus according to the present invention, since the first information D1 read out from the first program area Zp1 on the single magnetooptical disk D loaded to the inside and the second information D2 supplied thereto from the external input terminal φin are synthesized by the cross-fader 21 as the third information D3 and the third information D3 is recorded in the second program area Zp2 on the magnetooptical disk D, when audio data is edited and recorded, two kinds of reproducing and recording drives are not required and data on the magnetooptical disk D can be edited and recorded. Further, audio data becomes able to be recorded on and reproduced from the single magnetooptical disk D.

In particular, according to this embodiment, since the memory 18 for storing the first information D1 and the memory 19 for storing the third information are provided separately, each recording capacity can be optimized (optimally designed).

In the optical disk recording and reproducing apparatus, it is frequently observed that a so-called track jump occurs due to a shock applied from the outside or the like during recording and reproducing. If the track jump occurs during playback, then a reproduced sound is lost. If the track jump occurs during recording, an information signal is recorded on other track different from the track on which the information signal should be recorded.

Figure 4:
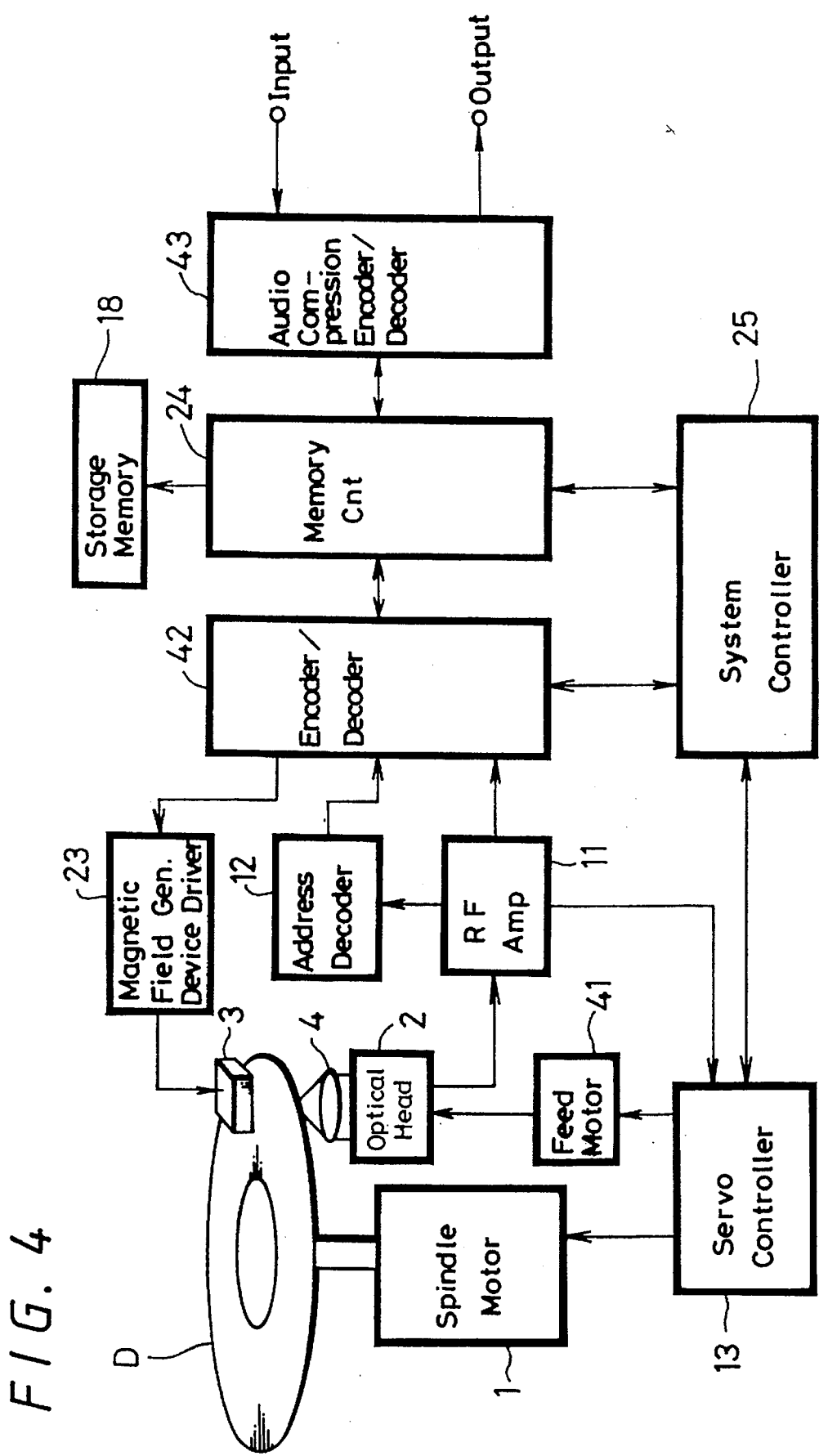
FIG. 4 is a block diagram showing an example of a disk drive with a shock-proof function.

The assignee of the present application has previously proposed a recording and reproducing apparatus having a so-called shock-proof memory function capable of avoiding a reproduction of sound from being interrupted (see Japanese laid-open patent publication No. 4-105273). The recording and reproducing apparatus will be described with reference to FIGS. 4 to 6. In FIG. 4, like parts corresponding to those of the embodiment (see FIG. 1) are marked with the same references.

FIG. 4 shows an example of such recording and reproducing apparatus. As shown in FIG. 4, the magnetooptical disk D is rotated by the spindle motor 1. The optical head 2 records an information signal on the magnetooptical disk D by a normal magnetic field modulation system or the like. The optical head 2 introduces a laser beam through the optical system such as the objective lens 4 into a beam splitter (not shown), in which a reflected beam is separated from the laser beam emitted from the laser light source and then introduced into a predetermined light-receiving system.

Information from the optical head 2 is converted into an electrical signal and the RF amplifier 11 separates the electrical signal supplied thereto to provide a servo control signal, address data and an EFM (eight-to-fourteen modulated) signal. The servo control signal is supplied to the servo controller 13 by which the spindle motor 1 is controlled. Also, the optical head 2 is driven by a feed motor 41.

An address signal and a data signal are decoded by an encoder/decoder 42 and stored in the memory 18 under control of the memory controller 24. The encoder/decoder 42, the memory controller 24 and the servo controller 13 are controlled by the system controller 25.

If an information signal from the outside is an audio signal, for example, then the audio signal is encoded or decoded by an audio compression encoder/decoder 43 and then input and output by the memory controller 24. This control is carried out by the system controller 25.

Data is recorded on a magnetooptical disk D with a diameter of 64 mm, for example, in the form of an EFM signal similarly to a so-called compact disk and read out from the magnetooptical disk D at a transfer rate of 1.4 megabits/second. Since the recorded signal is a compressed signal, such a signal can be decoded at a transfer rate of 0.3 megabit/second.

Figure 5:
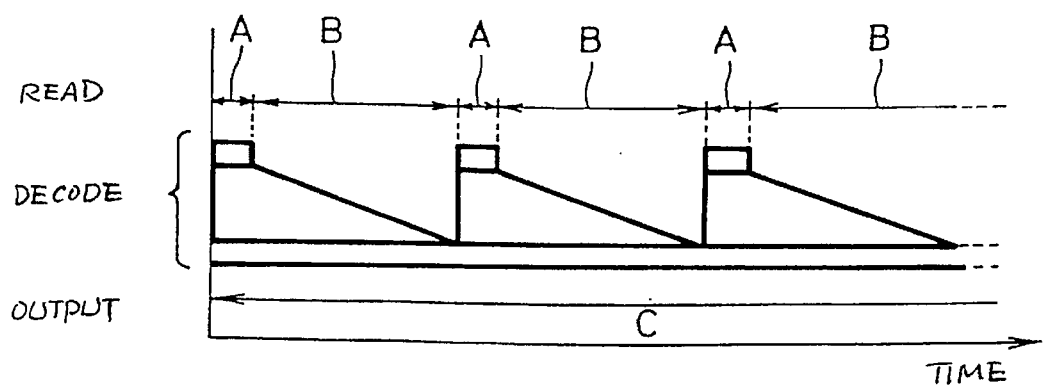
FIG. 5 is a timing chart showing a reproducing operation in the shock-proof memory function.

FIG. 5 schematically shows a reproducing operation of the recording and reproducing apparatus with the shock-proof memory function. A signal can be read out from the magnetooptical disk D intermittently as shown by time intervals A, a decoded signal can be output during standby times shown by time intervals B and a signal can therefore be reproduced continuously as shown by a time interval C.

Figure 6:
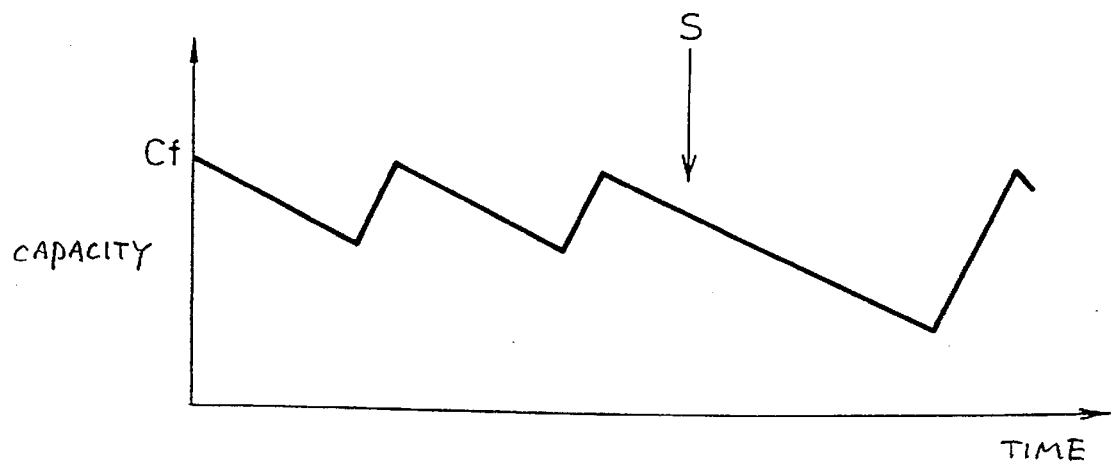
FIG. 6 is a timing chart showing a relationship between the shock-proof memory function and a memory capacity.

At that time, information is stored in the storage memory 18 at predetermined times up to a constant capacity Cf of about 1 megabit, for example, and then sequentially read out from the memory 18, thereby increasing the storage amount of the storage memory 18. Then, information is again stored in the memory 18 up to the capacity Cf. This operation is repeated as shown in FIG. 6.

When the recording and reproducing apparatus is shocked by an extraneous force at a time S, for example, extra information stored in the memory 18 is output, during which time a defect in tracking or the like is detected and the optical head 2 is returned to the ordinary track, and the system recovered.

Therefore, the output signal can be recorded or reproduced continuously and a recorded signal or reproduced signal can be prevented from being interrupted even when mis-tracking is caused with the application of a shock from the outside.

In the recording and reproducing apparatus according to this embodiment, an abnormality detecting circuit (not shown) for detecting an abnormality in the recording and reproducing operation may be connected between the output side of the first RF amplifier 11a and the servo controller 13, whereby an abnormality detecting signal may be input from the abnormality detecting circuit to the system controller 25. Then, at the time the above abnormality detecting signal is input to the system controller 25, if the memory controller 24 is controlled so as to continuously record and reproduce the audio signal without being interrupted due to a shock from the outside or the like, then it becomes possible to realize the recording and reproducing apparatus with the shock-proof memory function according to the present invention. Specifically, even when a shock is applied to the recording and reproducing apparatus from the outside, the output signal can be continuously recorded or reproduced, thereby preventing the mis-tracking from being caused and the recording and reproducing signal from being interrupted due to the shock applied thereto from the outside.

In this case, when the shock is applied to the magnetooptical disk D from the outside, similarly to the above-mentioned example (see FIG. 6), an abnormality is detected at the time S and the reading is stopped, during with time the first information D1 stored in the storage memory 18 is continuously output. During this period, a defective portion is detected. At that time, as compared with the operations shown in (1) to (5), i.e., operation in the stationary state, an amount of information remaining in the storage memory 18 and the output memory 19 is reduced.

Specifically, in this case, the storage capacities of the storage memory 18 and the output memory 19 are set upon design in accordance with estimations of retrieval performance (address retrieval function of the system controller 25) of the recording and reproducing apparatus and a recovery time for recovering the recording and reproducing apparatus when applied with a shock from the outside. Accordingly, the storage capacity is not limited to the above-mentioned 15 megabits.

Moreover, at that time, two signal processing systems are required for the reproducing and recording systems. For example, when a system is designed by two recording and reproducing apparatus, the signal processing systems of two systems are also required. Therefore, according to this embodiment, since the head loading mechanism, the optical head 2, the spindle motor 1 and the servo controller 13 can be composed of one system, the recording and reproducing apparatus according to the present invention can be made inexpensive and miniaturized.

If an external signal, i.e., user's voice is input by a microphone to the magnetooptical disk D on which music data was recorded in the first program area Zp1 and simultaneously recorded in the second program area Zp2 on the above magnetooptical disk D when recorded music data is being reproduced from the first program area Zp1 normally, then the user can enjoy the magnetooptical disk D as if the user were playing and recording the magnetooptical disk D in real time.

In particular, if reproduced audio data is used in a so-called taped musical accompaniment for amateur singers and a teaching machine for English language, then a magnetooptical disk D in which a user's voice data are recorded in real time can be made and edited by the single recording and reproducing apparatus and the single magnetooptical disk D.

While the first memory 19a and the second memory 19b are logically allocated as the output memory 19 for storing the third information D3 so as to be able to use the two kinds of memories as described above, the present invention is not limited thereto and the output memory 19 can be physically separated into the first memory 19a and the second memory 19b.

The storage memory 18a for storing therein the first information D1 and the output memory 18 may be formed as a single memory to which there can be logically allocated a memory area for storing the first information D1 and a memory area for storing the third information D3, respectively.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A recording and reproducing apparatus for recording and reproducing information in and from a recording medium, comprising:

first processing means for performing a first processing operation of reading out first information from the recording medium and storing the first information read out in a storage memory;

means for synthesizing first information of a predetermined capacity read out from the storage memory and second information input thereto from an outside source to produce third information;

second processing means for performing a second processing operation of writing the third information in an empty output memory;

third processing means for performing a third processing operation of reading out a predetermined amount of the third information from the output memory and recording the third information read out in the recording medium;

first control means for effecting a first operation cycle composed of the first processing operation, the second processing operation and a loop processing operation for repeating a composite operation of the second processing operation and the third processing operation until a storage capacity of the storage memory reaches a predetermined capacity;

second control means for effecting a second operation cycle composed of the first processing operation and a loop processing operation for repeating a composite operation of the second processing operation and the third processing operation until the storage capacity of the storage memory reaches a predetermined capacity; and third control means for controlling the second control means such that the second control means repeats the second operation cycle until reading is ended after the first control means effects the first operation cycle once.

2. A recording and reproducing apparatus according to claim 1, further comprising abnormality detecting means for detecting an abnormality in a recording and reproducing operation and reproducing operation stop means for stopping an operation of the first processing means during a predetermined period based on an abnormality detecting signal input thereto from the abnormality detecting means.

3. A recording and reproducing apparatus according to claim 2, further comprising recording operation stop means for stopping an operation of the third processing means based on the abnormality detecting signal input thereto from the abnormality detecting means.

4. A recording and reproducing apparatus according to claim 2 or 3, further comprising reproducing position correcting means for correcting a reproducing position shifted by a shock applied from the outside based on the abnormality detecting signal input thereto from the abnormality detecting means when the abnormality detecting means detects that an abnormality is caused by the shock applied from the outside.

5. A recording and reproducing apparatus according to claim 2 or 3, further comprising recording position correcting means for correcting a recording position shifted by a shock applied from the outside based on the abnormality detecting signal input thereto from the abnormality detecting means when the abnormality detecting means detects that an abnormality is caused by the shock applied from the outside.

6. A recording and reproducing apparatus according to claim 1, wherein the recording medium includes a read-only area and a recordable area, the first information is information in the read-only area and the third information is information recorded on the recordable area.

7. A recording and reproducing method for recording and reproducing information in and from a recording medium, comprising the steps of:

a first processing step for reading out first information from the recording medium and storing the read first information in a storage memory;

synthesizing first information of a predetermined capacity read out from the storage memory and second information input thereto from an outside source to produce third information;

a second processing step for writing the third information in an empty output memory; and a third processing step for reading out third information of a predetermined capacity from the output memory and recording the third information read out in the recording medium, wherein after a first operation cycle composed of the first processing step, the second processing step and a loop processing operation for repeating a composite operation of the second processing step and the third processing step until a storage capacity of the storage memory reaches a predetermined capacity is carried out, a second operation cycle composed of the the first processing step and a loop processing operation for repeating a composite operation of the second processing step and the third processing step until the storage capacity of the storage memory reaches a predetermined capacity is repeated until a reading is ended.

8. A recording and reproducing method according to claim 7, wherein the first processing step is stopped for a predetermined period when an abnormality of recording and reproducing operation is detected at least in the first processing step.

9. A recording and reproducing method according to claim 8, wherein the third processing step is stopped for a predetermined period when an abnormality of recording and reproducing operation is detected during the third processing step is executed.

10. A recording and reproducing method according to claim 8 or 9, wherein a reproducing position shifted by a shock applied from the outside is corrected based on the abnormality of recording and reproducing operation when the abnormality is caused by the shock applied from the outside.

11. A recording and reproducing method according to claim 8 or 9, wherein a recording position shifted by a shock applied from the outside is corrected based on the abnormality of recording and reproducing operation when the abnormality is caused by the shock applied from the outside.

12. A recording and reproducing method according to claim 7, wherein the first information is read out from a read-only area of the recording medium and the third information is recorded on a recordable area of the recording medium.

* * * * *